Aug. 31, 1937.   W. C. WEBER   2,091,898
CRYSTALLIZATION
Filed July 7, 1933   2 Sheets-Sheet 2

INVENTOR
WILLIAM C. WEBER
BY Arthur Middleton
ATTORNEY

Patented Aug. 31, 1937

2,091,898

UNITED STATES PATENT OFFICE 2,091,898

CRYSTALLIZATION

William C. Weber, Larchmont, N. Y., assignor to The Dorr Company, Inc., New York, N. Y., a corporation of Delaware Application July 7, 1933, Serial No. 679,287

14 Claims. (Cl. 23—1)

This invention relates to a method for continuously controlling precipitation of salts or impurities from solutions by concentration and crystallization.

The main object is to prevent premature precipitation in the evaporator, and undesirable deposits in the associated vapor tubes and condenser. Such precipitates and deposits, if not properly controlled, may foul heater-tubing in the evaporator as well as the condenser to such an extent as to necessitate the frequent shutdown of the plant and laborious overhauling of the affected elements.

Other objects are to establish a positive method of controlling and maintaining within narrow limits, a desired saturation or degree of super-saturation in the evaporator; to induce prompt and effective precipitation in a subsequent separating zone, so crystal-free saturated solution may be returned to the evaporator; and finally to devise a practical arrangement to obtain the above ends which is so simple and accurate as to enable an operator to readily keep the plant in running order.

In order to identify this invention broadly, it must be understood that this is not a method as is frequently attempted, of controlling the size of crystals to be formed, but a control or timing of precipitation itself.

A typical example to illustrate the nature of the difficulties encountered is found in concentrating phosphoric acid, for example such as obtained from a plant of the "Dorr" type. In this instance, encrustations in the vapor pipes and condenser are mainly due to silica carried up as volatile silico-fluorides by heat decomposition of fluosilicic acid ($H_2SiF_6$) and its corresponding sodium and potassium salts, while the evaporator surfaces may be fouled by precipitation of gypsum or sodium and potassium fluosilicates.

While, therefore, this invention is described more or less in connection with phosphoric acid concentration it is understood to be in no way restricted to that particular embodiment, but to be applicable to many similar conditions in the precipitation of salts or impurities.

This invention proposes an arrangement comprising a zone of concentration or evaporation in which a low degree of supersaturation is induced, the degree being too low to cause the spontaneous formation of nuclei in the concentrating zone, and a separate zone in which the condensation of the precipitates is effected so as to return only a saturated crystal-free solution to the zone of concentration.

More specifically, in order to obtain its ends, this invention proposes to recirculate forcibly a controlled amount of saturated solution from the separating stage through the evaporating stage.

Therefore, according to one feature, forced circulation of saturated solution through the evaporation stage is so controlled that the concentration in the evaporator may be closely kept at a predetermined point of supersaturation. The dampening effect of a relatively large volume of recirculation as compared with the feed volume makes possible such close control, so that precipitation in the evaporator may be safely avoided.

Another aspect of thus introducing definitely controlled large volumes of saturated solution into the evaporator, lies in the fact that the concentration change in the evaporator is correspondingly very small, hence there would be little, if any, change in the solubility of the impurities, with the result that potential deposits would either not precipitate at all or would tend to but slightly supersaturate.

This method of concentration control in the evaporator is of specific importance where a preferred combination of evaporator and heater is used, that is to say a standard outfit where the heater is not bodily separated from the evaporator or concentrator chamber, but the heater tubes are located directly within the evaporator chamber. While the use of such evaporator unit is economical and preferred in many instances for advantages of installation and operation, smooth ebullition is difficult to maintain therein, especially with flash operation (i. e., where the feed is hotter than the charge), so that deposits due to local concentration are likely to form upon the heater tubes and the evaporation may be too rapid, so that boiling over and entrainment may occur with concomitant danger to the condenser and its connections. In other words, in these respects, the preferred evaporator unit is more sensitive than other known installations where the heater is bodily separated from the concentrator and where, by its individually chosen location, the heater may be placed under sufficient hydrostatic pressure to avoid flashing and depositing of crystals in a nascent state upon the heater tubes.

However, in view of the aforesaid, it is obvious that ill effects in the operation of the preferred evaporator heater unit can be readily overcome due to the dampening effect of the controlled circulation of large volumes of saturated solution. In other words, an increase in the rate of circulation will cause a decrease in the change of concentration effected by the evaporator. Consequently, the circulation can be kept positively at such a rate that for instance there would be little, if any, change in the solubility of the impurities with the result that the solution in the evaporator would be approximately on the borderline of saturation or altogether not sufficiently supersaturated to cause any appreciable amount of precipitation. The small change of concentration furthermore dampens or eliminates the tendency to flashing and hence, the tendency towards precipitation upon the heater tubes under the low pressure of the evaporating chamber.

Another important feature is concerned with the phase of precipitating the impurities from the pregnant solution after evaporation. The precipitate obtained is separated and the remaining saturated or supernatant solution made available for reuse in the evaporator.

This feature relies upon the characteristic of the solubility curve for the impurities or salts, such as found for instance in the above mentioned case of phosphoric acid concentration. The characteristic results from the fact that the solubility of the compounds or impurities increases but slightly with temperature, but shows a marked decrease with increased concentration. In other words, the impurities are less soluble in the strong than in the weak acid.

Now in order to effect precipitation, this feature contemplates the mixture with the fresh feed of a suitable amount of saturated or supersaturated crystal-free solution as released from the evaporator. This is to induce the potential crystals contained in the feed to precipitate in a medium in which they have a lower solubility. In other words, the solubility of the impurities at the low concentration of the feed is relatively high and they have little tendency to precipitate. However, this lower concentration can be changed abruptly by mixture with a suitable and preferably large amount of the more highly concentrated evaporator discharge. In this way the saturation of the feed is swung immediately into the range of lower solubility of the impurities. With regard to these freshly introduced dissolved impurities, the mixture may then become sufficiently supersaturated according to the solubility curve to cause of itself precipitation. Or else, according to varying conditions, the tendency of precipitation is increased through the mixture to such an extent that additional seed crystals will cause prompt elimination. The addition of seed crystals merely means that the precipitation is rendered more positive.

It is clear that the ratio of the volumes mixed is important and preferably so controlled that the concentration of the mixture falls within the range most favorable for intended precipitation. Approximately, the larger the ratio, the safer the effect.

According to a third feature a simple throttle means, or resistance valve, or control valve is provided to handle the important control of the rate of recirculation. A saturated solution is forced under hydrostatic or atmospheric pressure through a connection into the evaporator and the control valve is interposed in that connection. The setting of the valve will control the rate of recirculation of saturated solution and thereby the concentration in the evaporators. With a relatively large volume of recirculation maintained, this control permits fine adjustment, offering the possibility of keeping close to the point of concentration desired to keep the evaporator free from precipitate.

A preferred embodiment of this invention provides an evaporator heater unit having an atmospheric discharge for the concentrated solution leading into a mixing station or container where fresh feed is added, thus causing precipitation according to the new method. The mixture, if necessary, together with seed crystals is pumped to a gravity tank or thickener from which supernatant saturated solution is allowed to return through the control valve to the evaporator. Precipitate in the form of sludge may be withdrawn from the thickener at a constant rate. Fresh feed may pass through a feed regulating device also at a set rate into the mixing station. The rate of evaporation is also constant as a rule, hence the control valve is the only variable left permitting maintenance of the desired operating condition, for the prevention of the above mentioned difficulties with regard to scaling and fouling. It will be seen that a change made in the rate of recirculation will affect none but the concentration in the evaporator.

The invention possesses other objects and features of advantage some of which with the foregoing will be set forth in the following description.

In the accompanying drawings, there has been illustrated the best embodiment of the invention known to me, but such embodiment is to be regarded as typical only of many possible embodiments and the invention is not to be limited thereto. In the drawings.

Figure 1:
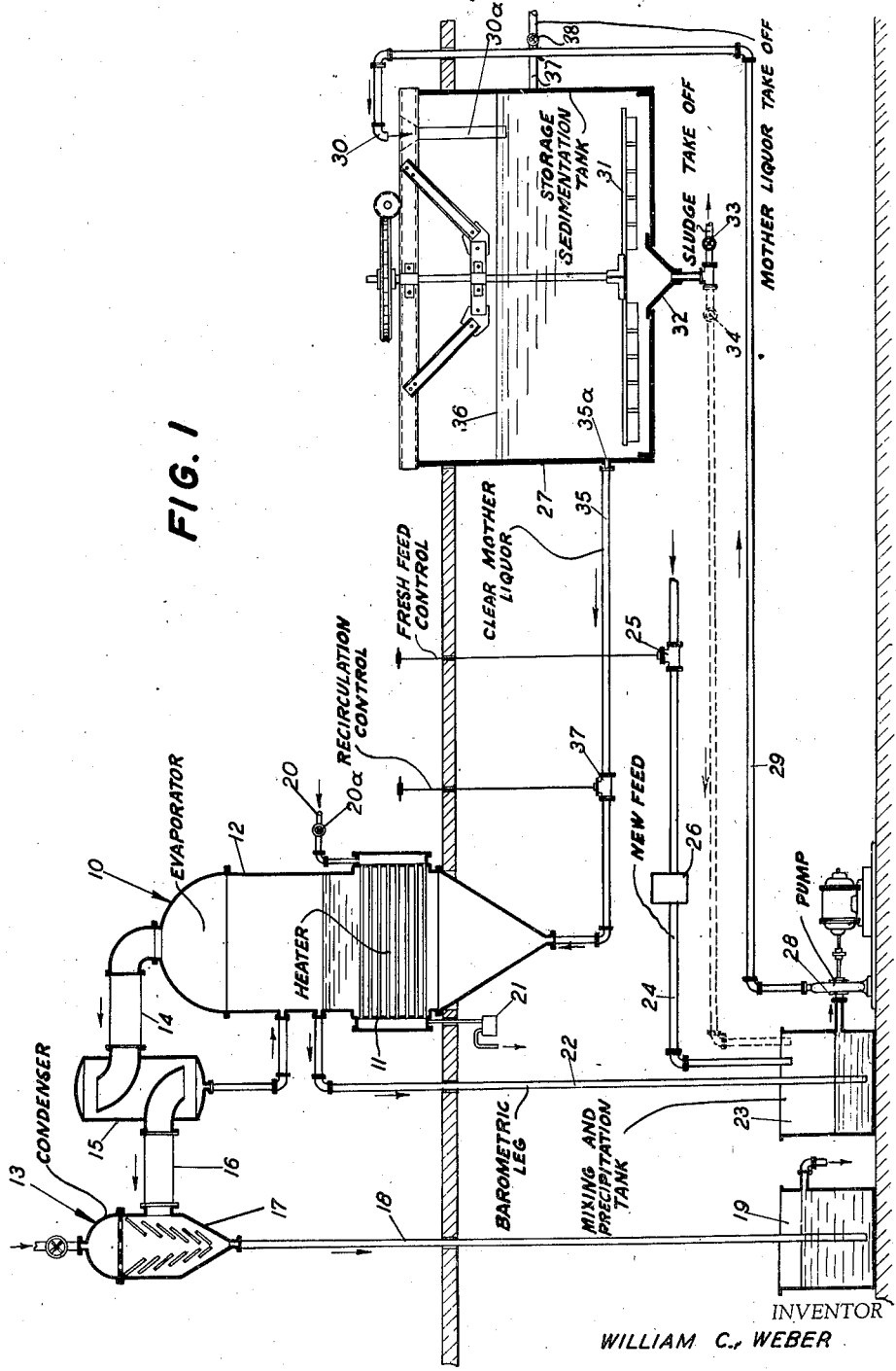
Fig. 1 is the diagrammatic showing of a preferred arrangement to carry out the process of this invention.

In the embodiment shown in Fig. 1 an arrangement to perform this process comprises an evaporator unit 10. A heating system 11 is built into the evaporator chamber 12 which is shown to be connected with a condenser 13 through vapor pipe 14, trap 15, and vapor pipe 16. The condenser is indicated by a cooling chamber 17 discharging condensate through an atmospheric leg 18 terminating in a water seal or container 19. The heating tubes of the evaporator heating system are fed by steam as at 20, passing through a regulating valve 20a, having a condensate outlet indicated at 21.

A concentrated solution is discharged from the evaporator as through pipe 22 shown to be in the nature of a barometric leg having a liquid seal in a container or tank 23. This container 23 also constitutes a mixing station, in that new feed is delivered thereto for mixture with the concentrated solution, through feed pipe 24. As will be shown hereinafter, it is in this tank 23 that condensation of salt crystals or impurities is caused to take place. There is shown a hand operated control valve 25 in the feed pipe, as well as a feed regulating device 26, the latter for the purpose of maintaining a constant rate of feed, for instance in the nature of an overflow device.

A mixed solution, consisting of the concentrated solution from the evaporator plus new feed, is transferred from the mixing tank or station 23 to a storage or sedimentation tank 27 as through pump 28 and pipe line 29. The mixed solution is thus delivered at 30 preferably through a feed well 30a into the sedimentation tank 27 where the solids or crystals which have formed are given an opportunity to settle upon the bottom from whence they may be continuously removed as indicated by well-known traveling rakes 31 which move settled sludge to the outlet 32. The rate of sludge removal may be controlled substantially by a valve 33. There is also shown somewhat below the liquid level 36 of the settling and storage tank an outlet connection 37 having a control valve 38 for the withdrawal of mother liquor from the system. A relatively small part of the sludge may be returned to the mixing tank 23 and used for seeding, that is to say, for the purpose of intensifying the precipitation of crystals in the mixing tank 23 and for crystal growth, seeding however being old of itself. A valve 34 is indicated to control the amount of sludge being returned for seeding purposes.

From the sedimentation tank 27, clarified mother liquor is returned to the evaporator 10 as through pipe 35. It is to be noted that the mother liquor is taken off at a point 35a below the liquid level 36 in the sedimentation or storage tank 27, and that the relative elevation of evaporator and of the sedimentation tank is such as to induce spontaneous flow of mother liquor through said pipe 35. It is important to note that a throttle valve 37 is arranged in the pipe 35. By manipulating this valve it is possible to regulate the volume of mother liquor which is desired to be returned to the evaporator in order to obtain best results.

Figure 2:
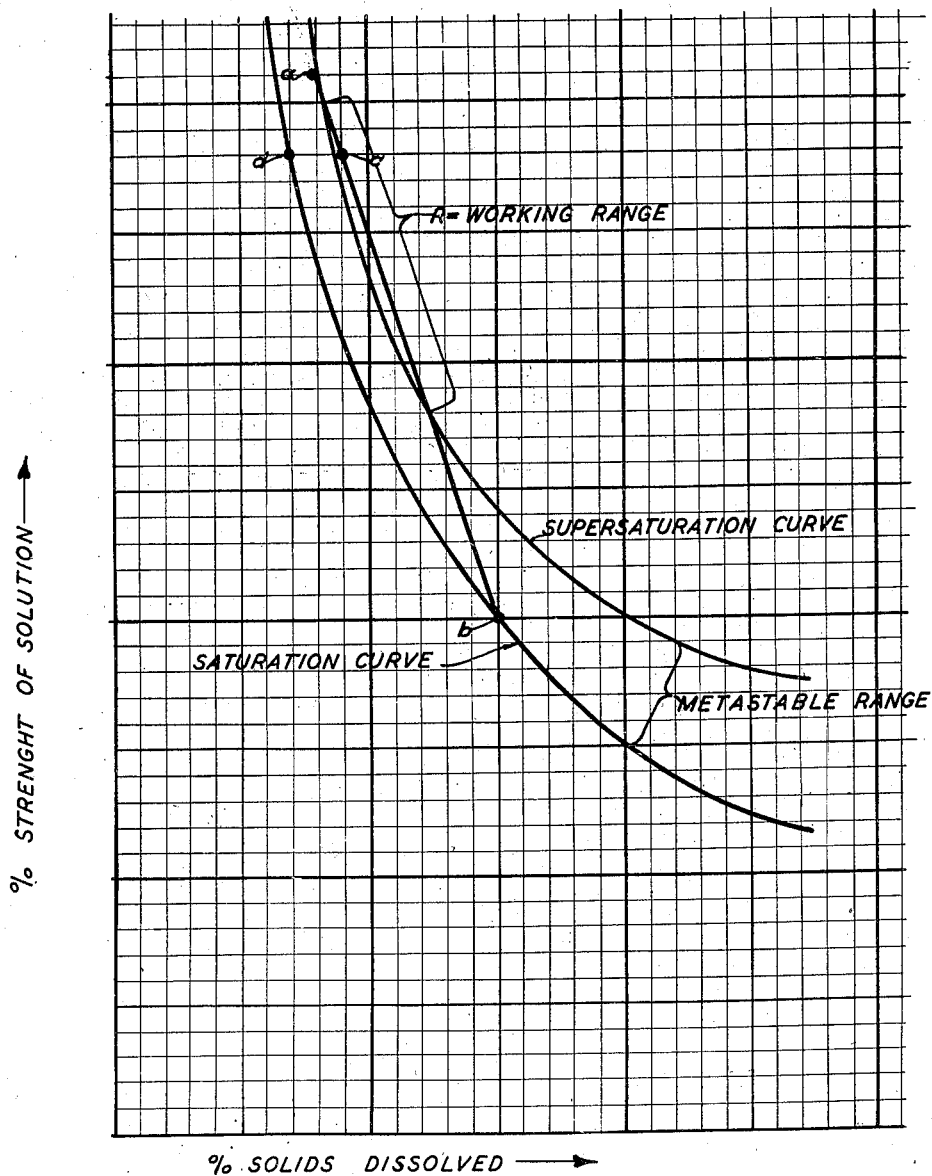
Fig. 2 shows an example of saturation or solubility curves illustrating the mechanism of this process.

For a better understanding of the basis of operation, the method may first be theoretically explained on the basis of the diagram shown in Fig. 2. This shows in a general tentative way the characteristics of solubility of certain salts in certain solutions, and these are broadly the characteristics which were encountered in treating phosphoric acid as mentioned above. That is to say the principle as covered by this invention should include the treatment of any solution that has inherent to it the general solubility pattern which may be defined as that portion of the solubility curve which includes a working range limited by a suitable upper and a suitable lower concentration value and within which working range of concentrations the solubility of impurities in the solutions decreases with increasing concentration of the solution at a rate greater than that of a straight line function. For a concrete example of such a solution one may consult pertinent handbooks or solubility tables such for instance as found in Seidell's Solubilities of Inorganic and Organic Compounds. The diagram shows the percentage of dissolved salts or impurities in function of the strength of the solution. The curve marked "Saturation curve" coordinates those points in the diagram, at which theoretically precipitation should take place. However, it is a known phenomenon that saturated crystal-free solutions may be further concentrated to a limited amount beyond the saturation point, and thus be "supersaturated" without having precipitation take place, unless such precipitation be induced as by the addition of seed-crystals. The limit of possible supersaturation is represented by the "supersaturation curve" in the diagram. This means that if the concentration of the solution is increased beyond that limit, precipitation is sure to occur. The space or area between the two curves represents all possible stages of supersaturation, and is generally known as the "metastable range."

However, it should be understood that what is herein called the "Supersaturation curve" is not necessarily a strictly defined plotted line but, due to the peculiarity of crystallization processes in general, some modifying factors and influences may cause points of spontaneous crystallization from the supersaturated solution to fall somewhat off such a curve. In other words, the supersaturation curve in effect rather constitutes the mean value of a relatively narrow critical zone or strip and points of supersaturation herein referred to as being located substantially at the metastable limit, should be understood to lie substantially within that zone or strip and either to the right or to the left of, but closely adjacent to, if not directly upon, that curve.

Consequently, in order to define the entire range of supersaturation herein considered to practice the invention, such range may be said to cover crystallization points located relatively near, that is, at either side of a theoretical or hypothetical supersaturation curve or metastable limit, or else they may fall positively and appreciably beyond the supersaturation curve or metastable limit so that the precipitation is at once spontaneous and no longer subject to any potential modifying influence.

In order to cover the entire potential range, that is, with respect to points straddling around and near a supersaturation curve, as well as points lying positively and appreciably beyond that curve, it might be said that the solution or mixture to be considered should be supersaturated at least to a degree corresponding to a point located substantially at the metastable limit.

Inasmuch as the curves of this diagram are of a hypothetical nature and not by any means plotted on the basis of actual data pertaining solely to phosphoric acid, it follows that they are not to be taken as a singular case to which this invention applies, but that they merely serve as an illustration of the basic principle according to which solutions may be purified or ridded of certain crystallizable matter, provided that a certain set of conditions is met, namely, if the compounds or impurities to be precipitated have the peculiar solubility characteristics herein referred to.

It should then be understood that this invention, on the basis and as a result of theoretical considerations herein set forth, will teach an operator having to do with purification or crystallization problems, a type of procedure or principle of operation for controlling or timing the precipitation as well as for scale prevention, which is generally applicable where the above set of conditions is met.

The mechanism of this method broadly conceived is perhaps best understood by way of the following broad interpretation of the graphical characteristics of the diagram in Fig. 2.

For such purpose of broadest interpretation let it be said that the method is one by which to effect the controlled precipitation of impurities from solutions which contain as a minor constituent crystallizable matter of the kind that shows decreasing solubility at increasing concentrations of the major substantially non-crystallizable constituent. While this classes the saturation curve as one that is leaning over towards the vertical axis of the co-ordinate system, further necessary limitations are implied in a certain concavity of the curve with respect to the co-ordinate system, and this will be clear from a contemplation of the characteristics of a tentative line such as the one marked *a—b*, inasmuch as it represents important points which mark assumed concentrations of the pregnant solution herein to be considered.

Therefore, if it be assumed that progressive concentration of the solution were to take place from a suitable lower limit of concentration at which the solution may be substantially saturated, to an upper limit of concentration at which it may be substantially supersaturated, such progressive concentration should be required, graphically speaking, to proceed along a straight line traversing the field of the metastable zone, and to involve passing through a range of intermediate concentrations at which the solution should then be supersaturated with respect to the minor constituent to a degree substantially greater than potential supersaturations at said limits of concentration, and more preferably the mixture should be supersaturated substantially to or beyond the curve of the metastable limit.

It is clear then that the higher degree of supersaturation thus induced in the resulting mixture disposes the mixture for, and encourages therein, spontaneous crystallization, and such crystallization may be realized by the very act of mixing alone, or it may be more precisely brought about or prompted through the addition of seed crystals.

In order to realize the ends of prevention of crystal formation in the evaporator, and prompt precipitation in a subsequent stage, this invention avails itself of the phenomenon of the "metastable range" just described. The mechanism of the process will be understood by reference to a hypothetical diagram such as in Fig. 2, illustrating conditions which would correspond to those encountered for example in a case of phosphoric acid concentration.

A certain volume of saturated crystal-free solution or acid is fed into the evaporator which concentrates it, delivering a slightly supersaturated, but crystal-free solution. The condition of the concentrated solution is indicated and determined by the working point *a* shown in the diagram near the supersaturated line and just within the metastable range.

To this concentrated solution there is to be added separately a certain volume of fresh feed in the form of saturated weak solution or acid. The condition of the feed is determined by the location of the working point *b* in the diagram.

The characteristic of the mixture of concentrated solution and fresh feed is determined by a point *c* which must be found upon the straight connecting line between *a* and *b*. The specific location of *c* upon the line *a—b* of course depends upon the ratio of the ingredients in the mixture.

It can be seen that under the prevailing conditions the point *c* of the mixture falls beyond the saturation curve and into the realm of spontaneous crystal formation. This means that due to the act of mixing, the potential crystals introduced with the feed are now suddenly thrown into a medium (the mixed solution) in which they have a lower solubility, so that the state of supersaturation is broken, causing enough crystals to condense to make the mixture a saturated solution as determined by the point *d* upon the saturation curve in the diagram. It is also noted that there is a preferred working range R within which the point *c* ought to be located. Thereafter the precipitated crystals may be removed and the saturated crystal-free mother liquor returned to feed the evaporator at a desired rate. On the basis of the known respective concentrations for the concentrated solution, and for the new feed, and for the mixture, the rate of recirculation can be computed by way of simple proportions.

On the basis of the preferred arrangement shown in Fig. 1 and by way of example referring to phosphoric acid as the pregnant solution, the practice of this process may now be described as follows:

A certain volume of saturated crystal-free phosphoric acid is fed into the evaporator which concentrates it to say 41%, delivering a slightly supersaturated but crystal-free solution. To this concentrated solution there is added in a separate stage a certain volume of fresh feed in the form of saturated weak phosphoric acid as it is furnished, for instance, from the acid filters in the operation of a phosphoric acid plant, the concentration of which saturated weak solution may be assumed to be 20%. The concentration of the mixture of the concentrated acid and the weak acid, of course, depends upon the ratio of the two components and in the present case it is set at 38%. On the basis of these respective concentrations, that is, 41% for the concentrated acid, 20% for the new feed, and 38% for the mixture, it is found that the weight ratio between the new feed and the volume of recirculation in this case is 1:6. That is to say, a relatively small change of concentration in the evaporator stage and a close control of such a change, are made possible through the dampening effect of a relatively large recirculation of the crystal-free mother liquor.

Assuming a certain state of operation, a desirable rate of evaporation in the evaporator 10 is fixed by adjusting the steam inlet valve 20a for the evaporator heating system 11. The solution fed to the evaporator is saturated and of a corresponding fixed concentration, which here is 38%. The volume of circulation through the evaporator is fixed. Under these conditions the evaporator may deliver a concentrated solution of 41% concentration which is "supersaturated" as explained above, through the barometric leg 22, into the tank 23 in order to be mixed with new feed solution introduced through pipe 24 into the mixing tank.

The feed regulating device 26 indicates that the feed also enters the system at a desired fixed rate, there being a shutoff valve 25 for rough control. By mixture of the feed with a proper volume of concentrated supersaturated solution the phenomenon of precipitation will be induced in the tank 23. If the volume of the concentrated solution is relatively large as compared with that of the feed, the potential crystals introduced with the feed are suddenly thrown into a medium in which they have a lower solubility, so that the state of supersaturation will be broken, and enough crystals will condense to make the mixture a saturated solution as determined by the point *d* upon the saturation curve (see diagram). The condensation of crystals is thus prevented in the evaporator, but promptly induced in the mixing tank by such mixture. The mixture is then thoroughly agitated through the pump 28 which lifts it through pipe 29 to a point of discharge 30 into the storage or sedimentation tank 27. A feedwell 30a prevents undue disturbance of the liquid in the tank by the feed. In the tank the precipitated crystals are allowed to settle out, permitting crystal-free mother liquor to be returned to the evaporator 10 for concentration. Sludge is withdrawn continually through outlet 32 and valve 33 at a suitable rate. A variation of the liquid level in the tank may absorb fluctuations or it may be compensated for by the setting of the sludge valve 33. Clear mother liquor from the sedimentation tank is taken off for recirculation at a point 35a below the liquid level 36, establishing a hydrostatic head above the point of take-off, while the outlet connection 37' and valve 38 provide for the controlled withdrawal of mother liquor from the system. The sedimentation tank 27 may also be in the nature of a constant level tank. The elevation of the storage or sedimentation tank 27 relative to the evaporator is shown to be such as to cause spontaneous flow of mother liquor to the evaporator.

The following points must be especially noted:

The volume or rate of transit of the returning mother liquor can be closely controlled by the setting of the valve 37. This is important because it controls the final concentration of the solution in the evaporator, and of course it is vital to maintain that concentration closely within the limits of supersaturation to prevent premature precipitation in the evaporator. It should then be understood that if a suitable rate of evaporation is fixed, and likewise the rate and character of the new feed constant as well as the rate of sludge elimination from the system, the simple operation of the control valve 37 alone will maintain the plant in optimum running order. When the valve is adjusted, the opening thereof will cause a faster circulation of solution, that is a greater volume will pass through the evaporator, and hence the final concentration effected by the evaporator will be lowered.

On the other hand, reducing the valve opening will lower the circulating volume, and hence increase the concentration effected by the evaporator. It is thus possible to keep the concentration within the narrow limits of supersaturation allowed in the evaporator. As explained above, the circulating volume is relatively large so that its close control through a simple valve can be readily effected. This large amount of circulation will further effect prompt condensation of crystals in the mixing tank 23. A large amount of circulation is correlated to a small change of concentration in the evaporator and will therefore also have a marked effect with regard to dampening flash evaporation in the evaporator and danger of unduly increasing local concentration at the surface of the heater tubes.

It must be noted that a change in the volume of the circulating solution will affect only the degree of evaporator concentration, but will obviously leave all other operating data unchanged, which explains the extreme simplicity of control.

I claim:

1. Method for effecting precipitation of crystallizable impurities from solutions by way of concentration within a working range limited by a suitable upper and a suitable lower concentration value such as hereinafter mentioned and within which working range of concentrations the solubility of the impurities in the solution decreases with increasing concentration of the solution at a rate greater than that of a straight line function; characterized by concentrating substantially saturated and substantially crystal-free solution within the metastable range of crystallizable impurities to said upper concentration value and in a manner known to preclude spontaneous crystallization thereof, then lowering the concentration of the thus concentrated solution by admixing therewith fresh saturated solution having said lower concentration value and which is substantially lower than that of the first mentioned saturated crystal-free solution prior to its concentration, the ratio of the respective volumes being mixed and the respective concentrations thereof being such that the mixture has a higher degree of supersaturation relative to the metastable limit and with respect to crystallizable matter than has the said concentrated solution, and inducing crystallization of the impurities in the mixture.

2. Method according to claim 1, in which the respective volumes and concentrations of the component solutions of the mixture are such that the mixture is supersaturated to a point substantially beyond the metastable limit.

3. Method according to claim 1, in which mother liquor from the mixture provides said saturated substantially crystal-free solution for concentration.

4. Method according to claim 1, in which the concentration step is conducted in a continuous manner, and in which a storage volume of the mixture is accumulated to allow for segregation of the mixture therein into solids and mother liquor, and in which such mother liquor is continuously returned to the concentrating step at a rate controlled to maintain said upper concentration as well as a desired degree of supersaturation in the solution resulting from that step.

5. Method according to claim 1, in which the concentration step is conducted in a continuous manner, and in which a storage volume of the solution mixture is accumulated to allow for segregation of the mixture therein into solids and mother liquor, and in which such mother liquor is continuously returned to the concentrating step at a rate controlled to maintain said upper concentration as well as a desired degree of supersaturation in the solution resulting from that step and in which said return of mother liquor into the concentrating stage is effected by atmospheric pressure together with the hydrostatic pressure from said accumulated solution mixture 6. Method according to claim 1, in which the concentration step is conducted in a continuous manner, and in which mother liquor separated from the solution mixture is continuously recirculated at a controllable rate, which rate of recirculation is controlled to maintain said degree of final concentration and a desired degree of supersaturation in the solution resulting from that step.

7. Method according to claim 1, in which the concentration step is conducted in a continuous manner, and in which mother liquor obtained through sedimentation of the solids from said solution mixture is continuously recirculated to and through the concentrating step, and in which settled solids on the one hand and mother liquor on the other hand are continuously withdrawn from the circuit, the rate of recirculation being controlled to maintain the said degree of concentration and a desired degree of supersaturation in the solution resulting from that step.

8. Method for effecting precipitation of crystallizable impurities from phosphoric acid solutions by way of concentration within a working range limited by a suitable upper and a suitable lower concentration value such as hereinafter mentioned and within which working range of concentrations the solubility of the impurities in the solution decreases with increasing concentration of the solution at a rate greater than that of a straight line function; characterized by concentrating substantially saturated and substantially crystal-free solution within the metastable range of crystallizable impurities to said upper concentration value and in a manner known to preclude spontaneous crystallization thereof, then lowering the concentration of the thus concentrated solution by admixing therewith fresh saturated solution having said lower concentration value and which is substantially lower than that of the first mentioned saturated crystal-free solution prior to its concentration, the ratio of the respective volumes being mixed and the respective concentrations thereof being such that the mixture has a higher degree of supersaturation relative to the metastable limit and with respect to crystallizable matter than has the said concentrated solution, and inducing crystallization of the impurities in the mixture.

9. Method according to claim 8, in which the respective volumes and concentrations of the component solutions of the mixture are such that the mixture is supersaturated to a point substantially beyond the metastable limit.

10. Method according to claim 8, in which mother liquor from the mixture provides said saturated substantially crystal-free solution for concentration.

11. Method according to claim 8, in which the concentration step is conducted in a continuous manner, and in which a storage volume of the mixture is accumulated to allow for segregation of the mixture therein into solids and mother liquor, and in which such mother liquor is continuously returned to the concentrating step at a rate controlled to maintain said upper concentration as well as a desired degree of supersaturation in the solution resulting from that step.

12. Method according to claim 8, in which the concentration step is conducted in a continuous manner, and in which a storage volume of the solution mixture is accumulated to allow for segregation of the mixture therein into solids and mother liquor, and in which such mother liquor is continuously returned to the concentrating step at a rate controlled to maintain said upper concentration as well as a desired degree of supersaturation in the solution resulting from that step and in which said return of mother liquor into the concentrating stage is effected by atmospheric pressure together with the hydrostatic pressure from said accumulated solution mixture.

13. Method according to claim 8, in which the concentration step is conducted in a continuous manner, and in which mother liquor separated from the solution mixture is continuously recirculated at a controllable rate, which rate of recirculation is controlled to maintain said degree of final concentration and a desired degree of supersaturation in the solution resulting from that step.

14. Method according to claim 8, in which the concentration step is conducted in a continuous manner, and in which mother liquor obtained through sedimentation of the solids from said solution mixture is continuously recirculated to and through the concentrating step, and in which settled solids on the one hand and mother liquor on the other hand are continuously withdrawn from the circuit, the rate of recirculation being controlled to maintain the said degree of concentration and a desired degree of supersaturation in the solution resulting from that step.

WILLIAM C. WEBER.